United States Patent
Lu et al.

(10) Patent No.: US 9,027,110 B2
(45) Date of Patent: May 5, 2015

(54) SYSTEM AND METHOD FOR COMMUNICATION BETWEEN DYNAMIC TOKEN AND TOOL

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/116,913

(22) PCT Filed: Aug. 28, 2012

(86) PCT No.: PCT/CN2012/080651
§ 371 (c)(1),
(2), (4) Date: Nov. 11, 2013

(87) PCT Pub. No.: WO2013/063974
PCT Pub. Date: May 10, 2013

(65) Prior Publication Data

US 2014/0101747 A1    Apr. 10, 2014

(30) Foreign Application Priority Data

Oct. 31, 2011   (CN) .......................... 2011 1 0337984

(51) Int. Cl.
*H04W 12/06*   (2009.01)
*H04W 52/02*   (2009.01)
(Continued)

(52) U.S. Cl.
CPC ............. *H04W 12/06* (2013.01); *H04L 63/067* (2013.01); *H04L 63/0838* (2013.01); *H04W 12/12* (2013.01); *H04W 52/0229* (2013.01)

(58) Field of Classification Search
USPC ............................................................ 726/9
See application file for complete search history.

(56) References Cited

U.S. PATENT DOCUMENTS 5,706,239 A * 1/1998 Brys .............................. 365/226
6,490,687 B1 * 12/2002 Nagai ............................... 726/9
(Continued)

FOREIGN PATENT DOCUMENTS

CN    1604549 A  *  4/2005
CN    1604549 A     4/2005
(Continued)

OTHER PUBLICATIONS

"Evros: A Service-Delivery Platform for Extending Security Coverage and IT Reach", Dimitrios Stiliadis, Andrea Francini, Sanjay Kamat, Mansoor Alicherry, Adieseshu Hari, Pramod V. Koppol, Ashok K. Gupta, and Dor Skuler, Bell Labs Technical Journal 12(3), 101-119 (2007.*

(Continued)

*Primary Examiner* — Yonas Bayou
(74) *Attorney, Agent, or Firm* — Harness, Dickey & Pierce, P.L.C.

(57) ABSTRACT

The present invention relates to the field of information security. Disclosed are a system and method for communication between a dynamic token and a tool, the system comprising a tool part and a dynamic token part; the tool part comprises a control module and a tool radio frequency communication module; the dynamic token part comprises an MCU and liquid crystal module and an OTP radio frequency communication module. The method comprises: the tool part transmits a modulated wake-up command signal to the dynamic token part in the form of an electromagnetic wave; when a wake-up response command signal returned by the dynamic token part is correctly received, the tool part transmits the modulated command signal to the dynamic token part in the form of an electromagnetic wave; and the tool part detects the amplitude variation of the generated carrier signal, judges whether the response signal is correctly received, and operates correspondingly.

19 Claims, 6 Drawing Sheets

(51) Int. Cl.
*H04L 29/06* (2006.01)
*H04W 12/12* (2009.01)

(56) References Cited

U.S. PATENT DOCUMENTS

| | | | |
|---|---|---|---|
| 7,743,409 B2 * | 6/2010 | Gonzalez et al. | 726/9 |
| 7,748,031 B2 * | 6/2010 | Gonzalez et al. | 726/9 |
| 7,761,717 B2 * | 7/2010 | Moller et al. | 713/189 |
| 7,765,585 B2 * | 7/2010 | Chao et al. | 726/5 |
| 8,220,039 B2 * | 7/2012 | Gonzalez et al. | 726/9 |
| 8,509,424 B2 * | 8/2013 | Deng | 380/28 |
| 2001/0054148 A1 * | 12/2001 | Hoornaert et al. | 713/172 |
| 2003/0014660 A1 * | 1/2003 | Verplaetse et al. | 713/200 |
| 2008/0034216 A1 * | 2/2008 | Law | 713/183 |
| 2009/0064294 A1 * | 3/2009 | Cook et al. | 726/6 |
| 2009/0125997 A1 * | 5/2009 | Cook | 726/6 |

FOREIGN PATENT DOCUMENTS

| | | | |
|---|---|---|---|
| CN | 102130767 | A | 7/2011 |
| CN | 102130767 | A * | 7/2011 |
| CN | 102394752 | A | 3/2012 |
| EP | 1933252 | A1 * | 6/2008 |

OTHER PUBLICATIONS

Satoh et al., "Single Sign on Architecture with Dynamic Tokens", 2004, 4 pages.*
International Search Report for PCT/CN2012/080651 (in Chinese with English translation), mailed Dec. 6, 2012; ISA/CN.

* cited by examiner

SYSTEM AND METHOD FOR COMMUNICATION BETWEEN DYNAMIC TOKEN AND TOOL

CROSS REFERENCE TO RELATED APPLICATIONS

This application is a 371 U.S. National Stage of International Application No. PCT/CN2012/080651 filed on Aug. 28, 2012, which claims priority to Chinese Patent Application No. 201110337984.9, filed on Oct. 31, 2011. The contents of the above applications are incorporated herein by reference in their entirety.

FIELD OF THE INVENTION

The present invention relates to information security field, more particularly, to a system of communicating a dynamic token with a tool and a method thereof.

BACKGROUND OF THE INVENTION

In the prior art, dynamic token, which is also called One-time Password (OTP), is safe and convenient technology of preventing an account number from being stolen. By using the technology, an unpredictable random number combination is generated according to dedicated algorithm and each password can only be used for one time. When a user is authenticated, besides an account number and a static password are needed to be input; a dynamic password is also needed to be input by the user. Only if the user is authenticated by a system successfully, can the user normally logon or transaction be performed so as to ensure the legitimacy and uniqueness of the identity of the user. The obvious advantage of dynamic token lies in that the passwords used by the user are different from time to time so as to prevent a criminal from faking identity of a legitimate user. The dynamic password authentication technology is regarded as one of best effective ways for solving user identity authentication at present, which can effectively prevent network problems such as stealing user account password by a hacker or Trojan virus or fake website and preventing the loss of financial property or materials of user. At present, the dynamic token is widely used in fields such as e-bank, network games, telecommunication provider, e-administration and enterprises, etc.

At present, most dynamic tokens connect to and communicate with a producing tool (tool part) by an exposed hardware interface; and such hardware interface has many disadvantages such as weak security, bad seal, bad capability of water-proof and dust-proof and low production efficiency, etc.

SUMMARY OF THE INVENTION

Due to the shortcoming of prior art and in order to solve problem of secure sealing in a process of using a dynamic token, the present invention provides a system of communicating the dynamic token with a tool and a method thereof by radio frequency communication technology, in which the dynamic token does not need to directly contact with the tool.

The solution of the present invention includes the following.

A system of communicating a dynamic token and a tool is disclosed, and the system comprises a tool part and a dynamic token part which are communicated with each other by radio frequency communication technology, wherein the tool part includes a controlling module and a tool radio frequency communicating module;

the controlling module is configured to generate wake-up instruction signal and/or operating instruction signal and send the signal to the tool radio frequency communicating module, determine whether response signal returned by the dynamic token part is correctly received, and control to output prompting information of successful communication or error according to determining result;

the tool radio frequency communicating module is configured to, under the control of the controlling module, generate corresponding modulated signal by using the carrier signal generated by the tool radio frequency communicating module and the wake-up instruction signal and/or the instruction signal, send the modulated signal to an OTP (one time password) radio frequency communicating module of the dynamic token part in electromagnetic form, and receive response signal returned by the OTP radio frequency communicating module and send the response signal to the controlling module;

the dynamic token part includes an MCU (Microprocessor Control Unit) and liquid crystal module and the OTP frequency communicating module;

the OTP radio frequency communicating module is configured to receive the modulated signal sent by the tool radio frequency communicating module in electromagnetic form, extract and process the received modulated signal; send the result signal obtained by extracting and processing to the MCU and liquid crystal module and further return corresponding response signal to the tool radio frequency communicating module;

the MCU and liquid crystal module is configured to determine whether the result signal sent by the OTP radio frequency module is correct instruction signal; and generate corresponding response signal if the result signal is correct instruction signal and send the response signal to the OTP radio frequency communicating module.

The process of the controlling module generating and sending the wake-up instruction signal specifically includes: determining whether sending the wake-up operating instruction is required; and, if the result of determining is yes, controlling the radio frequency communicating module to output carrier signal, generating the wake-up instruction signal after a specified time delay and sending the wake-up instruction signal to the tool radio frequency communicating module;

the process of the controlling module generating and sending the operating instruction signal specifically includes: detecting the baud rate of the dynamic token part when receiving the response signal of the wake-up operating instruction in a predetermined time generating the operating instruction signal according to the detected baud rate and sending the operating instruction signal to the tool radio frequency communicating module.

The operating instruction signal includes obtaining hardware information instruction signal, crystal outputting and controlling instruction signal, setting crystal calibration data instruction signal, extracting OTP data instruction signal and programming seed instruction signal;

the modulated signal includes modulated wake-up instruction signal and modulated operating instruction signal.

The tool radio frequency communicating module includes a signal preparing and receiving-sending sub-module and a signal processing sub-module;

the signal preparing and receiving-sending sub-module includes:

a carrier signal generating unit configured to generate carrier signal;

a signal mixing unit configured to, under the control of the controlling module, output the carrier signal to a first signal strength adjusting unit; and mix the instruction signal sent by the controlling module and the carrier signal to obtain the modulated signal;

the first signal strength adjusting unit configured to adjust the strength of the carrier signal and the modulated signal;

a signal driving unit configured to drive the signal output by the first signal strength adjusting unit and amplify the power of the output signal; and a tool part LC (Inductor-Capacitor) mutual inducting unit configured to send the signal output by the signal driving unit to the dynamic token part and further configured to receive the signal returned b the dynamic token part;

the signal processing sub-module is configured to extract and process the signal which is returned by the dynamic token part and received by the tool part LC mutual inducting unit and send the extracted and processed signal to the controlling module.

The signal processing sub-module includes:

a signal extracting unit configured to extract the signal returned by the dynamic token part and received by the tool part LC mutual inducting unit;

an interference eliminating unit configured to eliminate the affect of the signal sent by the preparing and receiving-sending sub-module on the signal processing sub-module;

a signal amplifying unit configured to amplify the signal obtained by the signal extracting unit;

a filtering unit configured to filtering and eliminating the high frequency component output by the signal amplifying unit; and a signal rectifying unit configured to converse the signal output by the filtering unit to be TTL (Transistor-transistor logic) signal which can be identified by the controlling module.

The signal processing sub-module includes:

a signal extracting unit configured to extract the signal received by the tool part LC mutual inducting unit;

a second signal strength adjusting unit configured to adjust the strength of the signal extracted by the signal extracting unit;

a phase adjusting unit configured to perform reverse-phase processing on the carrier signal generated by the carrier generating unit;

a mixing and comparing unit configured to mix the signal output by the second signal strength adjusting unit and the signal output by the phase adjusting unit and send the mixed signal to the signal rectifying unit;

a synchronizing signal extracting unit configured to obtain the carrier signal generated by the carrier generating unit; extract and process the carrier signal to obtain synchronizing clock signal and send the synchronizing clock signal to the signal rectifying unit; and the signal rectifying unit configured to arrange the signal output by the mixing and comparing unit according to the synchronizing clock signal and send the signal obtained by comparing and arranging to the controlling module.

The OTP radio frequency communicating module includes:

a dynamic token part LC mutual inducting unit configured to receive the signal sent by the tool part, and return the signal to the tool part under the control of a data sending and controlling unit;

a signal extracting and chip protecting unit configured to extract the signal received by the dynamic token part LC mutual inducting unit and process the signal obtained by extracting to obtain TTL signal which is identifiable and non-destructive to the MCU and liquid crystal module and send the TTL signal to the MCU and liquid crystal module;

the data sending and controlling unit configured to, under the control of the MCU and liquid crystal module, make two ends of an electric induction coil of the dynamic token part LC mutual inducting unit be inducting or disconnecting so as to affect the amplitude of the carrier signal generated by the tool part by the change of electromagnetic field.

A method of communicating a dynamic token and a tool is disclosed, wherein the method is based on radio frequency communicating technology and includes:

Step A, generating, by the tool part, wake-up instruction signal and carrier signal, obtaining modulated wake-up instruction signal according to the wake-up instruction signal and the carrier signal and sending the modulated wake-up instruction signal to the dynamic token part in electromagnetic form;

Step B, performing, by the tool part, corresponding operation on the received signal which is returned by dynamic token part to obtain operating result signal;

Step C, detecting, by the tool part, baud rate of the dynamic token part and determining whether the operating result signal obtained in Step B is correct wake-up responding signal, if yes, going to Step D; otherwise, outputting prompting information of error and ending;

Step D, generating, by the tool part, operating instruction signal according to the detected baud rate, obtaining modulated operating instruction signal according to the operating instruction signal and the carrier signal and sending the modulated operating instruction signal to the dynamic token part dynamic token part in electromagnetic form;

Step E, performing, by the tool part, corresponding operation on the signal returned by the dynamic token part to obtain operating result signal; and Step F, determining, by the tooling part, whether the operating result signal obtained in Step E is correct response signal, if yes, outputting prompting information of successful communication, ending or going back to Step A; otherwise, outputting prompt information of error and ending.

Step B and Step E specifically includes:

receiving, by the tool part, the signal returned by the dynamic token part and performing operations of detecting, removing DC component, amplifying, removing high frequency component and comparing and outputting;

the signal obtained by comparing and outputting is the operating result signal.

Step B and Step E specifically includes:

receiving, by the tooling part, the signal returned by the dynamic token part, after performing a process of removing DC (direct current) component on the signal, performing AND operation on the processed signal and the reverse-phase signal of the carrier signal, taking the signal obtained by AND operation as the input of a trigger, and taking signal obtained by performing AND operation on the carrier signal ant the signal obtained by voltage-dividing on the carrier signal as clock signal of the trigger;

the signal output by the trigger is the operating result signal.

Between Step A and Step B, and between the Step D and Step E, the method comprises a step of:

generating, by the tool part, high level signal, amplifying the signal obtained by performing AND operation on the high level signal and the carrier signal and outputting the amplified signal by the LC mutual inducting circuit in electromagnetic form.

A processing operation of the dynamic token part between Step A and Step B specifically includes:

Step a, receiving, by the dynamic token part, the signal sent by the tool part, performing operations of detecting, removing high frequency component and voltage-limiting on the received signal and determining whether the signal obtained by performing the operations is correct wake-up instruction signal, if yes, going to Step b; otherwise making no response and resting;

Step b, generating, by the dynamic token part, wake-up response signal and, under the control of the wake-up response signal, controlling an electric induction coil to affect the magnetic field around so as to affect the carrier signal of the tool part.

A corresponding operation of the dynamic token part between Step D and Step E specifically includes:

Step f, receiving, by the dynamic token part, the signal sent by the tool part, performing operations of detecting, removing high frequency component and voltage limiting on the received signal and determining whether the signal obtained by performing the operations is correct instruction signal, if yes, going to Step C; otherwise, making no response and resting;

Step g, storing and processing, by the dynamic token part, the data in the instruction signal and generating corresponding response signal and, under the control of the corresponding response signal, controlling an electric induction coil to affect the magnetic field around so as to affect the carrier signal of the tool part.

The operating instruction signal includes obtaining hardware information instruction signal, crystal outputting and controlling instruction signal, setting crystal calibration data instruction signal, extracting OTP data instruction signal and programming seed instruction signal.

When the operating instruction signal is the obtaining hardware information instruction signal, the tool part determines whether hardware information returned by the dynamic token part is correctly received in a predetermined time; if yes, sends the crystal outputting and controlling signal or the extracting OTP data instruction signal; otherwise, outputs prompt information of error and ends the process.

When the operating instruction signal is the crystal outputting and controlling signal, the tool part determines whether clock signal returned by the dynamic token part is correctly received in a predetermined time, if yes, generates and sends the setting crystal calibration data instruction signal according to standard clock signal and the clock signal; otherwise, outputs prompting information of error and ends the process; wherein, the clock signal is second signal output with a specific frequency, clock signal of 32.768 KHZ or clock signal related to the clock signal of 32.768 KHZ after the dynamic token part correctly receives crystal outputting and controlling instruction signal sent by the tool part;

the process of generating the setting crystal calibration data instruction signal according to the standard clock signal and the clock signal specifically includes: computing, by the tool part, a deviation between the clock signal returned by the dynamic token part and the standard clock signal, computing out the crystal calibration data according to the deviation and generating the setting crystal calibration data instruction signal according to the crystal calibration data.

When the operating instruction signal is the setting crystal calibration data instruction signal, the tool part determines whether the successful communication instruction signal returned by the dynamic token part is correctly received in a predetermined time, if yes, sends the programming seed instruction signal; otherwise, outputs prompting information of error and ends the process.

When the operating instruction signal is the extracting OTP data instruction signal, the tool part determines whether corresponding data returned by the dynamic token part is correctly received in a predetermined time, if corresponding data is correctly received, determines whether the dynamic token satisfies a predetermined programming seed requirement according to the corresponding data, if the dynamic token satisfies the predetermined programming seed requirement, sends programming seed instruction signal, if the dynamic token does not satisfy the predetermined programming seed requirement, outputs prompting information of error and ends the process; if corresponding data is not correctly received, outputs prompting information of error and ends the process.

When the operating instruction signal is the programming seed instruction signal, the tool part determines whether successful communication instruction signal returned by the dynamic token part is correctly received in a predetermined time, if yes, outputs prompting information of successful communication for this time, ends or sends obtaining hardware information instruction signal; otherwise, outputs prompting information of error and ends the process.

Wherein, the step of controlling an electric induction coil to affect the magnetic field around so as to affect the carrier signal of the tool part includes:

switching two ends of the electric induction coil between conducting and disconnecting so as to affect the amplitude of the carrier signal generated by the tool part by the change of the electromagnetic field, wherein when the two ends of electric induction coil are conducting, the amplitude of the carrier signal generated by the tool part is affected, and when the two ends of the electric induction coil are disconnecting, the carrier signal generated by the tool part is not affected.

The advantages of the present invention include that no hardware interface is required at the dynamic token part because radio frequency communication is used between the dynamic token part and the tool part; therefore, complete sealing of the dynamic token can be realized, by which production process is simplified and production efficiency is improved. Security of the dynamic token is increased with the sealing, which reduces the risk of leaking seed and resetting of the dynamic token.

DETAILED DESCRIPTION OF THE INVENTION

In order to make the purpose, technical solution and advantages of the present invention clearer, the present invention will be described in detail hereinafter in conjunction with the drawings thereof and the embodiments.

In the present invention, "a tool" refers to a device to which a user intends to connect/access by using a dynamic token. For example, the device can be a terminal of fields such as e-bank, network game, a telecommunication provider, e-administration and enterprises.

Embodiment 1

Figure 1:
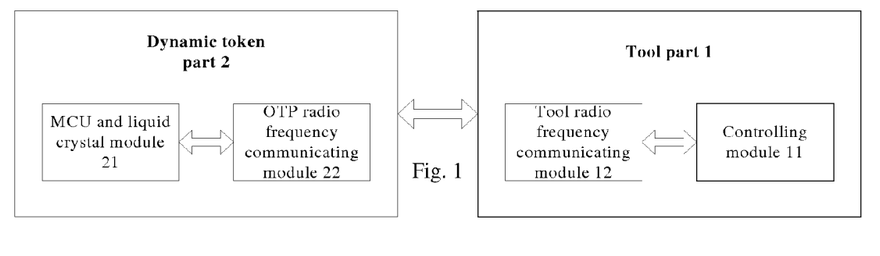
FIG. 1 is a schematic diagram of a system of communicating a dynamic token with a tool provided in Embodiment 1 of the present invention.

Referring to FIG. 1, a system of communicating a dynamic token with a tool is provided in Embodiment 1 of the present invention. The system includes a tool part 1 and a dynamic token part 2. The tool part 1 includes a controlling module 11 and a tool radio frequency communicating module 12. The dynamic token part 2 includes an MCU and liquid crystal module 21 and an OTP radio frequency communicating module 22. The functions of the above modules are discussed as follows.

The controlling module 11, connected with the tool radio frequency communicating module 12, is configured to compute a dynamic factor and a dynamic password, and further configured to determine whether an operating instruction is required to send; and, if the determining result is yes, to control the tool radio frequency communicating module to output carrier signal; generate wake-up instruction signal after specified time delay and send the wake-up instruction signal to the tool radio frequency communicating module 12; when receiving a wake-up response signal correctly in a predetermined time, to detect baud rate of the dynamic token part 2 and generate operating instruction signal according to the detected baud rate and send the operating instruction signal to the tool radio frequency communicating module 12; to determine whether corresponding response signal returned by the dynamic token part 2 is correctly received in a predetermined time; to determine whether the dynamic token part 2 meets the requirement of programming seed (programme the seed to an address) according to the response signal returned by the dynamic token part 2; and further to output prompt information of successful communication or error.

Specifically, in the present embodiment, the operating instruction includes obtaining hardware information instruction, crystal outputting and controlling instruction, setting crystal calibrating data instruction, extracting OTP data instruction and programming seed instruction, etc.

The tool radio frequency communicating module 12, connected with the controlling module 11, is configured to generate carrier signal; to output the carrier signal under the control of the controlling module 11; to receive the wake-up instruction signal and the operating instruction signal sent by the controlling module 11 to generate modulated signal; to amplify the carrier signal and the modulated signal and send the amplified signal to the dynamic token part 2 in the form of electromagnetic wave; and further to receive response signal returned by the dynamic token part 2 and perform corresponding operation on the response signal returned by the dynamic token part 2 and send the operating result signal to the controlling module 11, where the corresponding operation on the response signal includes signal extracting, signal amplifying, filtering and signal arranging, etc. (reference can be made to FIG. 4 and its introduction).

Specifically, the modulated signal includes modulated wake-up instruction signal and modulated operating instruction signal.

The MCU and liquid crystal module 21, connected with the OTP radio frequency communicating module 22, is configured to generate and display the dynamic password; further to determine whether the signal sent from the OTP radio frequency communicating module 22 is a correct instruction signal; and when the signal is a correct instruction signal, to generate corresponding response signal and send the response signal to the OTP radio frequency communicating module 22.

Specifically, the instruction signal includes the wake-up instruction signal and the operating instruction signal.

The OTP radio frequency communicating module 22, connected with the MCU and liquid crystal module 22, is configured to receive signal sent by the tool part 1, extract and process the received signal, send a result signal obtained by extracting and processing to the MCU and liquid crystal module 21, and further to return the response signal to the tool part 1.

Figure 2:
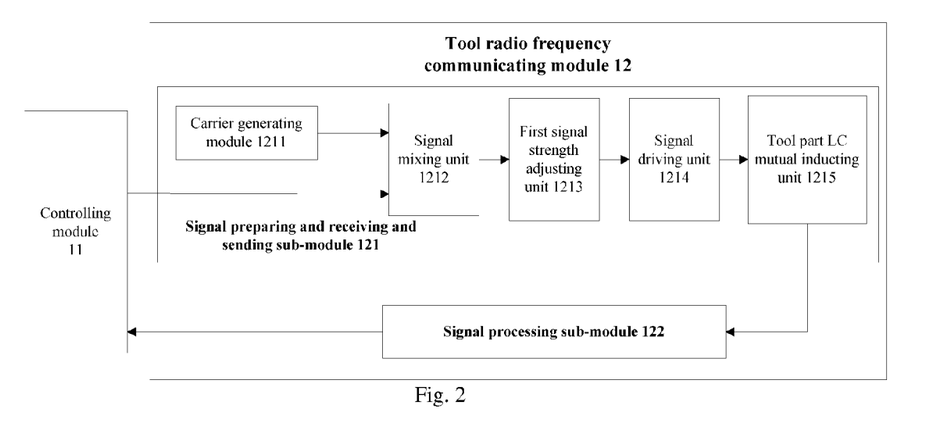
FIG. 2 is a structural diagram of a tool radio frequency communicating module of FIG. 1.

Referring to FIG. 2, the tool radio frequency communicating module 12 specifically includes a signal preparing and receiving-sending sub-module 121 and a signal processing sub-module 122. In this case, the signal preparing and receiving-sending sub-module 121 specifically includes a carrier generating unit 1211, a signal mixing unit 1212, a first signal strength adjusting unit 1213, a signal driving unit 1214 and a tool part LC mutual inducting unit 1215. Functions of above sub-modules and units are discussed as follows.

The carrier generating unit 1211, connected with the signal mixing unit 1212, is configured to generate carrier signal.

The signal mixing unit 1212, connected with the controlling module 11, the carrier generating unit 1211 and the first signal strength adjusting unit 1213, is configured to output the carrier signal to the first signal strength adjusting unit 1213 under the control of the controlling module 11, and to mix the instruction signal sent by the controlling module 11 and the carrier signal to obtain the modulated signal.

Preferably, in the present embodiment, the signal mixing unit 1212 outputs the carrier signal to the first signal strength adjusting unit 1213 under the control of the controlling module 11. Specifically, the signal mixing unit 1212 performs AND operation on level signal sent by the controlling module 11 and the carrier signal; when the level signal is high power level, the signal mixing unit 1212 outputs the carrier signal to the first signal strength adjusting unit 1213; when the level signal is low power level, the signal mixing unit 1212 does not output the carrier signal.

Preferably, in the present embodiment, the process of mixing the instruction signal sent by the controlling module 11 and the carrier signal to obtain the modulated signal specifically includes: performing AND operation on the instruction signal sent by the controlling module 11 and the carrier signal to obtain the modulated signal; when the instruction signal is the wake-up instruction signal, obtaining the modulated wake-up instruction signal; when the instruction signal is operating instruction signal, obtaining the modulated operating instruction signal.

The first signal strength adjusting unit 1213, connected with the signal mixing unit 1212 and the signal driving unit 1214, is configured to adjust the strength of the carrier signal or the modulated signal so as to make the signal driving unit 1214 work in a stable and available state.

The signal driving unit 1214, connected with the first signal strength adjusting unit 1213 and the tool part LC mutual inducting unit 1215, is configured to drive the signal output by the first signal strength adjusting unit 1213 so as to amplify the power of the signal.

The tool part LC mutual inducting unit 1215, connected with the signal driving unit 1214 and the signal processing sub-module 122, is configured to send the signal output by the signal driving unit 1214 to the dynamic token part 2 and further to receive the signal returned by the dynamic token part 2.

The signal processing sub-module 122, connected with the tool part LC mutual inducting unit 1215 and the controlling module 11, is configured to perform corresponding operation on the signal received by the tool part LC mutual inducting unit 1215 and send the signal of operation result to the controlling module 11.

Figure 3:
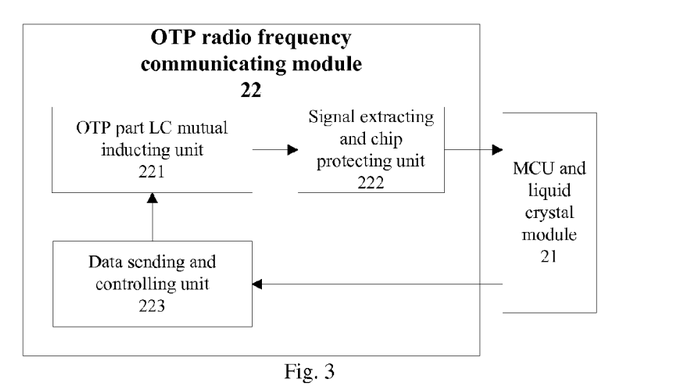
FIG. 3 is a structural diagram of an OTP radio frequency communicating module of FIG. 1.

Referring to FIG. 3, the OTP radio frequency communicating module 22 specifically includes a dynamic token part LC mutual inducting unit 221, a signal extracting and chip protecting unit 222 and a data sending and controlling unit 223. Specific functions of the above respective units are disclosed as follows.

The dynamic token part LC mutual inducting unit 221, connected with the signal extracting and chip protecting unit 222 and the data sending and controlling unit 223, is configured to receive the signal sent by the tool part 1 and, under control of the data sending and controlling unit 223, return response signal to the tool part 1.

Preferably, in the present embodiment, the process of the dynamic token part LC mutual inducting unit 221 returning the response signal to the tool part 1 under the control of the data sending and controlling unit 223, specifically includes that the dynamic token part LC mutual inducting unit 221 receives the signal sent by the data sending and controlling unit 223 and, under the control of the signal sent by the data sending and controlling unit 223, switches two ends of an electric induction coil between conducting and disconnecting so as to affect the amplitude of the carrier signal generated by the tool part 1 by the change of the electromagnetic field. For example, when the dynamic token part LC mutual inducting unit 221 receives low level signal, the two ends of the electric induction coil are conducting, which affects the amplitude of the carrier signal generated by the tool part 1; when the dynamic token part LC mutual inducting unit 221 receives high level signal, the two ends of the electric induction coil are disconnecting, which does not affect the carrier signal generated by the tool part 1; or when the dynamic token part LC mutual inducting unit 221 receives the high level signal, the two ends of electric induction coil are conducting, which affects the amplitude of the carrier signal generated by the tool part 1; when the dynamic token part LC inducting unit 221 receives low level signal, the electric induction coil is disconnecting, which does not affect the carrier signal generated by the tool part 1.

The signal extracting and chip protecting unit 222, connected with the dynamic token part LC mutual inducting unit 221 and the MCU(Microprocessor Control Unit) and liquid crystal module 21, is configured to extract the signal received by the dynamic token part LC mutual inducting unit 221 and process the extracted signal so as to obtain TTL (Transistor-transistor logic) signal which is identifiable and non-destructive for the MCU and liquid crystal module 21 and send the TTL signal to the MCU and liquid crystal module 21.

Preferably, in the present embodiment, the process of extracting and processing the signal received by the dynamic token part LC mutual inducting unit 221 specifically includes performing operation such as detection, high frequency component filtering and voltage limiting on the signal received by the dynamic token part LC mutual inducting unit 221.

The data sending and controlling unit 223, connected with the MCU and liquid crystal module 21 and the dynamic token part LC mutual inducting unit 221, is configured to, under the control of the MCU and liquid crystal module 21, make the two ends of the electric induction coil be inducted or disconnected so as to affect the amplitude of the carrier signal generated by the tool part 1 by the change of the electromagnetic field.

Embodiment 2

Figure 4:
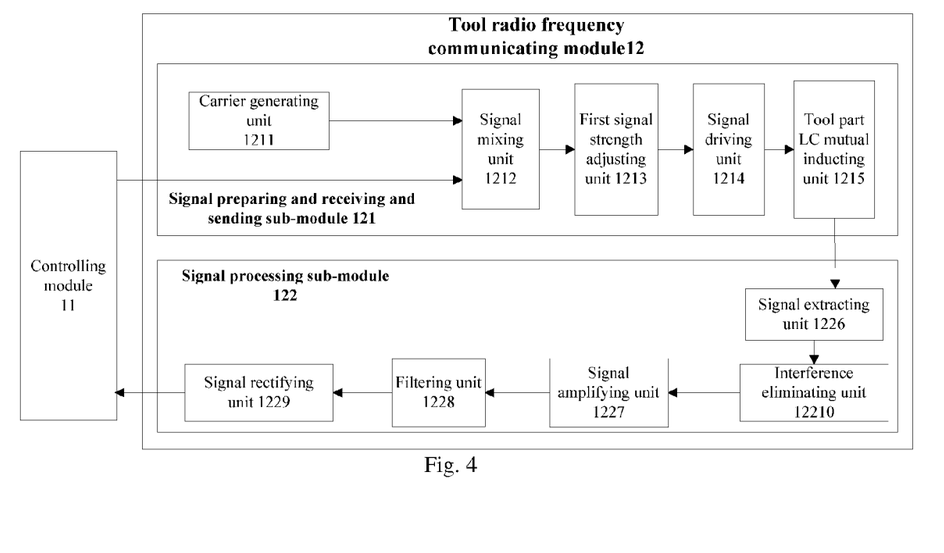
FIG. 4 is a structural diagram of a tool radio frequency communicating module provided in Embodiment 2 of the present invention.

Referring to FIG. 4, based on Embodiment 1, a tool radio frequency communicating module 12 corresponding to a signal processing sub-module 122 is provided in Embodiment 2. The tool radio frequency communicating module 12 specifically includes a signal preparing and receiving-sending sub-module 121 and a signal processing sub-module 122; in this case, the signal preparing and receiving-sending module 121 is identical to that of Embodiment 1; the signal processing sub-module 122 includes a signal extracting module 1226, a signal amplifying module 1227, a filtering unit 1228, a signal rectifying unit 1229 and interference eliminating unit 12210. Functions of above respective units are disclosed as follows.

The signal extracting unit 1226, connected with the tool part LC mutual inducting unit 1215 and interference eliminating unit 12210, is configured to extract signal returned by the dynamic token part from the signal received by the tool part LC mutual inducting unit 1215.

The signal amplifying unit 1227, connected with the filtering unit 1228 and the interference eliminating unit 12210, is configured to amplify the signal obtained by the signal extracting unit 1226.

The filtering unit 1228, connected with the signal amplifying unit 1227 and the signal rectifying unit 1229, is configured to filter and eliminate the high frequency component of the signal output by the signal amplifying unit 1227.

The signal rectifying unit 1229, connected with the filtering unit 1228 and the controlling unit 11, is configured to convert the signal output by the filtering unit 1228 to TTL signal which can be identified by the controlling module 11.

Interference eliminating unit 12210, connected with the signal extracting unit 1226 and the signal amplifying unit 1227, is configured to eliminate the affection of the signal sent by the signal preparing and receiving-sending module 121 on the signal processing sub-module 122.

Figure 5:
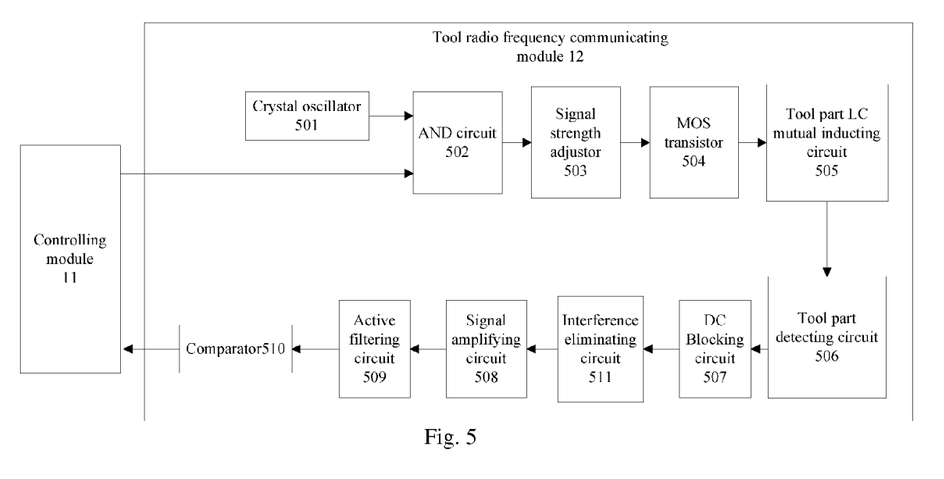
FIG. 5 is a detailed structural diagram of FIG. 4.

Referring to FIG. 5, a specific way of implementing the tool radio frequency communicating module 12 corresponding to FIG. 4 is provided in the present embodiment. The tool radio frequency communicating module 12 specifically includes a crystal oscillator 501, an AND circuit 502, a signal strength adjustor 503; an MOS transistor 504, a tool part LC mutual inducting circuit 505, a tool part detecting circuit 506, a DC (direct current) blocking circuit 507, a signal amplifying circuit 508, an active filtering circuit 509, a comparator 510 and an interference eliminating circuit 511. Specific connecting relation of above respective parts is disclosed as follows.

The two input ends of the AND circuit 502 are respectively connected with the carrier generator 501, and the controlling module 11; the output end of the AND circuit 502 is connected with one end of the signal strength adjustor 503; the other end of the signal strength adjustor 503 is connected with the MOS transistor 504; the output end of the MOS transistor 504 is connected with the tool part LC mutual inducting circuit 505; the tool part LC mutual inducting circuit 505 is further connected with the tool part detection circuit 506; the output end of the tool part detection circuit 506 is connected with the DC blocking circuit 507; the DC blocking circuit 507 is further connected with the interference eliminating circuit 511; the other end of the interference eliminating circuit is connected with the input end of the signal amplifying circuit 508; the output end of the signal amplifying circuit 508 is connected with the active filtering circuit 509; the active filtering circuit 509 is further connected with the input end of the comparator 510; the output end of the comparator 510 is connected with the controlling module 11.

The units in FIG. 5 are respectively corresponding to the units in FIG. 4. Specifically, the crystal oscillator 501 is corresponding to the carrier generating unit 1221 in FIG. 4; the AND circuit 502 in FIG. 5 is corresponding to the signal mixing unit 1222 in FIG. 4; the signal strength adjustor 503 in FIG. 5 is corresponding to the first signal strength adjusting unit 1223 in FIG. 4; the MOS transistor 504 in FIG. 5 is corresponding to the signal driving unit 1224 in FIG. 4; the tool part LC mutual inducting circuit 505 in FIG. 5 is corresponding to the tool part LC mutual inducting unit 1225 in FIG. 4; the tool detection circuit 506 and the DC blocking circuit 507 in FIG. 5 are corresponding to the signal extracting unit 1226 in FIG. 4; the signal amplifier 508 in FIG. 5 is corresponding to the signal amplifying unit 1227 in FIG. 4; the active filtering circuit 509 in FIG. 5 is corresponding to the filtering unit 1228 in FIG. 4; the comparator 510 in FIG. 5 is corresponding to the signal rectifying unit 1229 in FIG. 4; and the interference eliminating circuit 511 in FIG. 5 is corresponding to the interference eliminating unit 12210 in FIG. 4.

Embodiment 3

Figure 6:
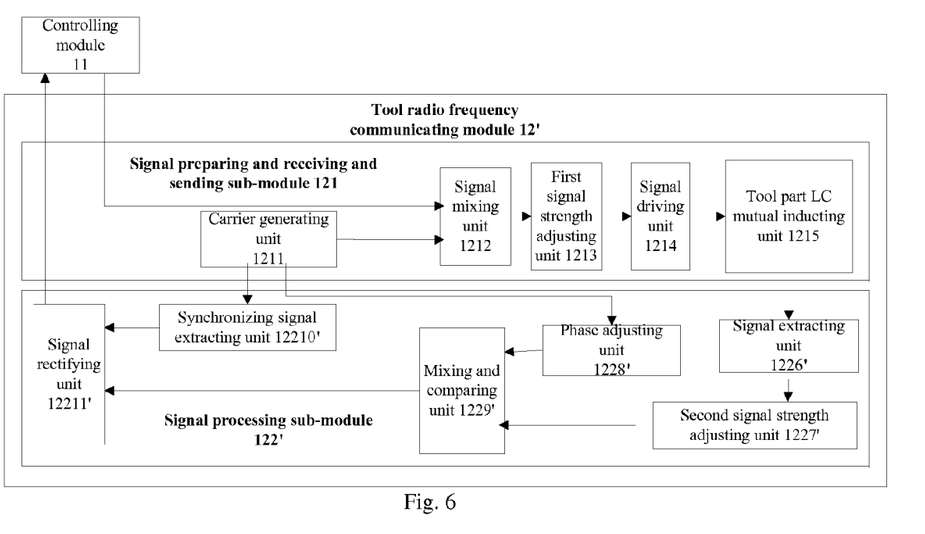
FIG. 6 is a structural diagram of an optimum tool radio frequency communicating module provided by Embodiment 3 of the present invention.

Referring to FIG. 6, on the basis of Embodiment 1, a tool radio frequency communicating module 12' is provided in Embodiment 3. Compared with the embodiment 2, the tool radio frequency communicating module 12 has a signal processing sub-module 122 which is better than the signal processing sub-module 122. Compared with Embodiment 2, the advantage of the solution of the embodiment 3 is that change in each carrier cycle of signal can be detected, i.e. the edge of the signal can be detected accurately, therefore, calibrating OTP clock by contactless communication method can be realized and the rate of communication is highly improved.

The tool radio frequency communicating module 12' specifically includes a signal preparing and receiving sending sub-module 121 and a signal processing sub-module 122'. The signal preparing and receiving-sending module 121 is identical to that of embodiment 1. The signal processing sub-module 122' includes a signal extracting unit 1226', a second signal strength adjusting unit 1227', a phase adjusting unit 1228', a mixing and comparing unit 1229', a synchronizing signal extracting unit 12210' and a signal rectifying unit 12211'. Specifically the functions of above respective units are disclosed as follows.

The signal extracting unit 1226', connected with the tool part LC mutual inducting unit 1215 and the second signal strength adjusting unit 1227', is configured to extract signal returned by the dynamic token part from the signal received by the tool part LC mutual inducting unit 1215.

The second signal strength adjusting unit 1227', connected with the signal extracting unit 1226' and the mixing and comparing unit 1229', is configured to adjust the strength of the signal extracted by the signal extracting unit 1226'.

The phase adjusting unit 1228', connected with the carrier generating unit 1211 and the mixing and comparing unit 1229', is configured to perform reverse-phase on the carrier signal generated by the carrier generating unit 1211.

The mixing and comparing unit 1229', connected with the second signal strength adjusting unit 1227', a phase adjusting unit 1228' and a signal rectifying unit 12211', is configured to mix the signal output by the second signal strength adjusting unit 1227' and the signal output by the phase adjusting unit 1228' and send the mixed signal to the signal rectifying unit 12211'.

Preferably, in the present embodiment, the process of mixing the signal output by the second signal strength adjusting unit 1227' and the signal output by the phase adjusting unit 1228' specifically includes performing AND operation on the signal output by the second signal strength adjusting unit 1227' and the signal output by the phase adjusting unit 1228'.

The synchronizing signal extracting unit 12210', connected with the carrier generating unit 1211 and the signal rectifying unit 12211', is configured to obtain the carrier signal from the carrier generating unit 1211, extract and process the carrier signal to obtain the synchronizing clock signal and send the synchronizing clock signal to the signal rectifying unit 12211'.

The signal rectifying unit 12211', connected with the mixing and comparing unit 1229' and the synchronizing signal extracting unit 12210', is configured to compare and rectify the signal output by the mixing and comparing unit 1229' according to the synchronizing clock signal and send the signal obtained by the comparing and the rectifying to the controlling module 11.

Figure 7:
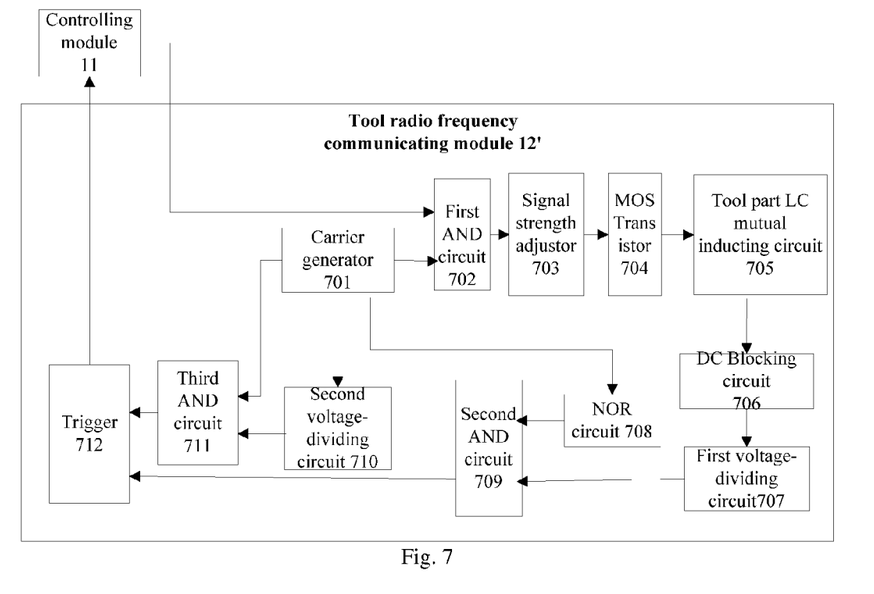
FIG. 7 is a detailed structural diagram of FIG. 6.

Referring to FIG. 7, a specific way of implementing a tool radio frequency communicating module 12' corresponding to FIG. 6 is provided in the present embodiment. The tool radio frequency communicating module 12' includes a carrier generator 701, a first AND circuit 702, a signal strength adjustor 703, a MOS transistor 704, a tool part LC mutual inducting circuit 705; a DC blocking circuit 706, a first voltage-dividing circuit 707, a NOR circuit 708, a second AND circuit 709, a second voltage-dividing circuit 710, a third AND circuit 711 and a trigger 712. The connecting relation of the above respective parts is disclosed as follows.

The two input ends of the first AND circuit 702 are respectively connected with the controlling module 11 and the carrier generator 701, the output end of the first AND circuit 702 is connected with one end of the signal strength adjustor 703; the other end of the signal strength adjustor 703 is connected with the MOS transistor 704; the MOS transistor 704 is further connected with the tool part mutual inducting circuit 705; the tool part mutual inducting circuit 705 is connected with one end of the DC blocking circuit 706; the other end of the DC blocking circuit 706 is connected with the first voltage-dividing circuit 707; the first voltage-dividing circuit 707 is further connected with one input end of the second AND circuit 709; the other input end of the second AND circuit 709 is connected with the output end of the NOR circuit 708; the input end of the NOR circuit 708 is connected with the output end of the carrier generator 701; the output end of the AND circuit 709 is connected with the D end of the trigger; the CP input end of the trigger is connected with the output end of the third AND circuit 711; the Q output end of the trigger is connected with the controlling module 11; one input end of the third AND circuit 711 is connected with the output end of the carrier generator 701; the other input end of the third AND circuit 711 is connected with the output end of the carrier generator 701 passing through the second voltage-dividing circuit 710.

The units in FIG. 7 are respectively corresponding to the units in FIG. 6. Specifically, the carrier generator 701 in FIG. 7 is corresponding to the carrier generating unit 1211 in FIG. 6; the first AND circuit 702 in FIG. 7 is corresponding to the signal mixing unit 1212 in FIG. 6; the signal strength adjustor 703 in FIG. 7 is corresponding to the first signal strength adjusting unit 1213 in FIG. 6; the MOS transistor 704 in FIG. 7 is corresponding to the signal driving unit 1214 in FIG. 6; the tool part LC mutual inducting circuit 705 in FIG. 7 is corresponding to the tool part LC mutual inducting unit 1215 in FIG. 6; the DC blocking circuit 706 in FIG. 7 is corresponding to the signal extracting unit 1226' in FIG. 6; the first voltage-dividing circuit 707 in FIG. 7 is corresponding to the second signal strength adjusting unit 1227' in FIG. 6; the NOR circuit 708 in FIG. 7 is corresponding to the phase adjusting unit 1228' in FIG. 6; the second AND circuit 709 in FIG. 7 is corresponding to the mixing and comparing unit 1229' in FIG. 6; the second voltage-dividing circuit 710 and the third AND circuit 711 in FIG. 7 are corresponding to the synchronizing signal extracting unit 12210' in FIG. 6; and the trigger 712 in FIG. 7 is corresponding to the signal rectifying unit 12211' in FIG. 6.

Embodiment 4

Figure 8:
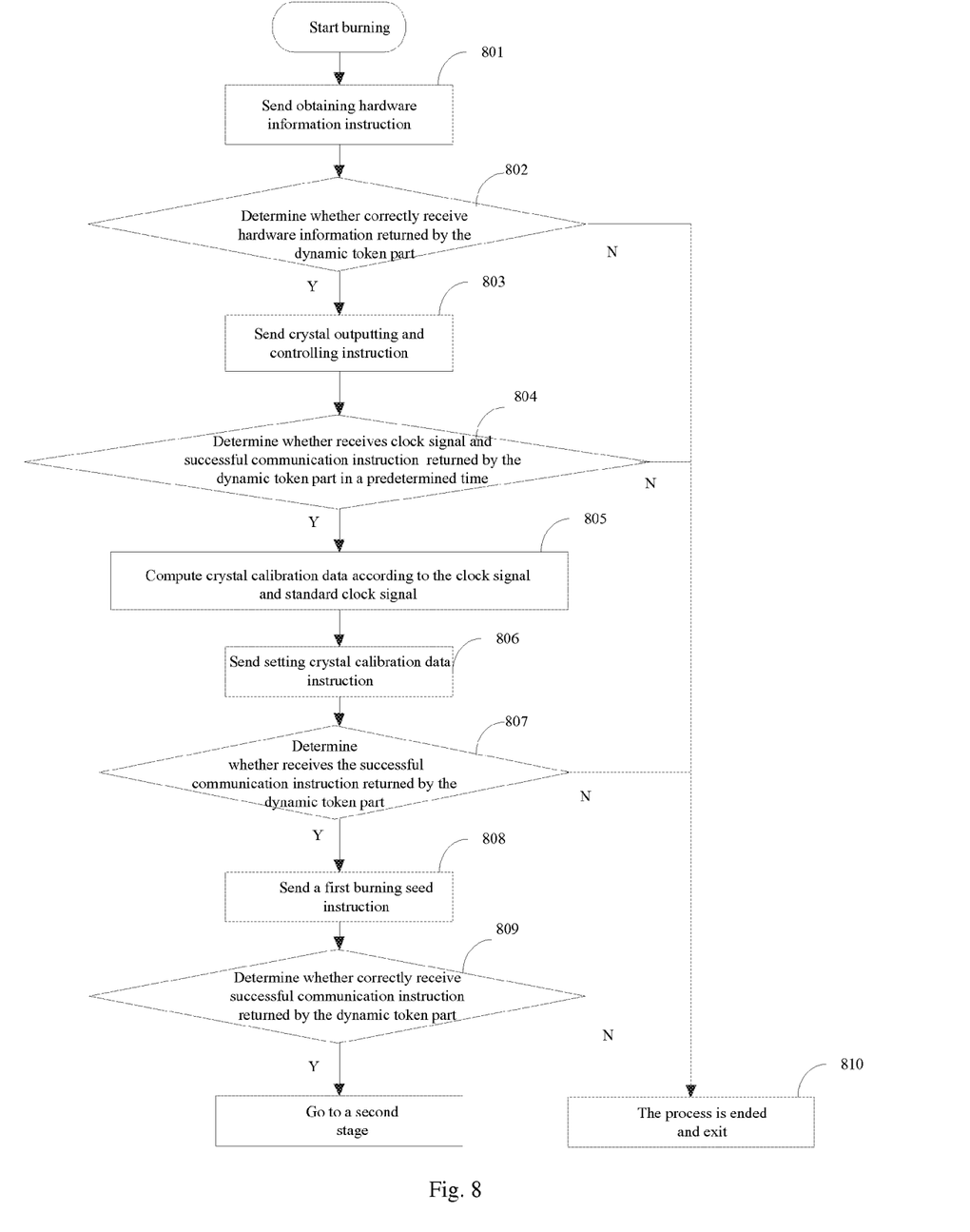
FIG. 8 is a flow chart of a first stage of a method for communicating a dynamic token with a tool provided by Embodiment 4 of the present invention.
Figure 9:
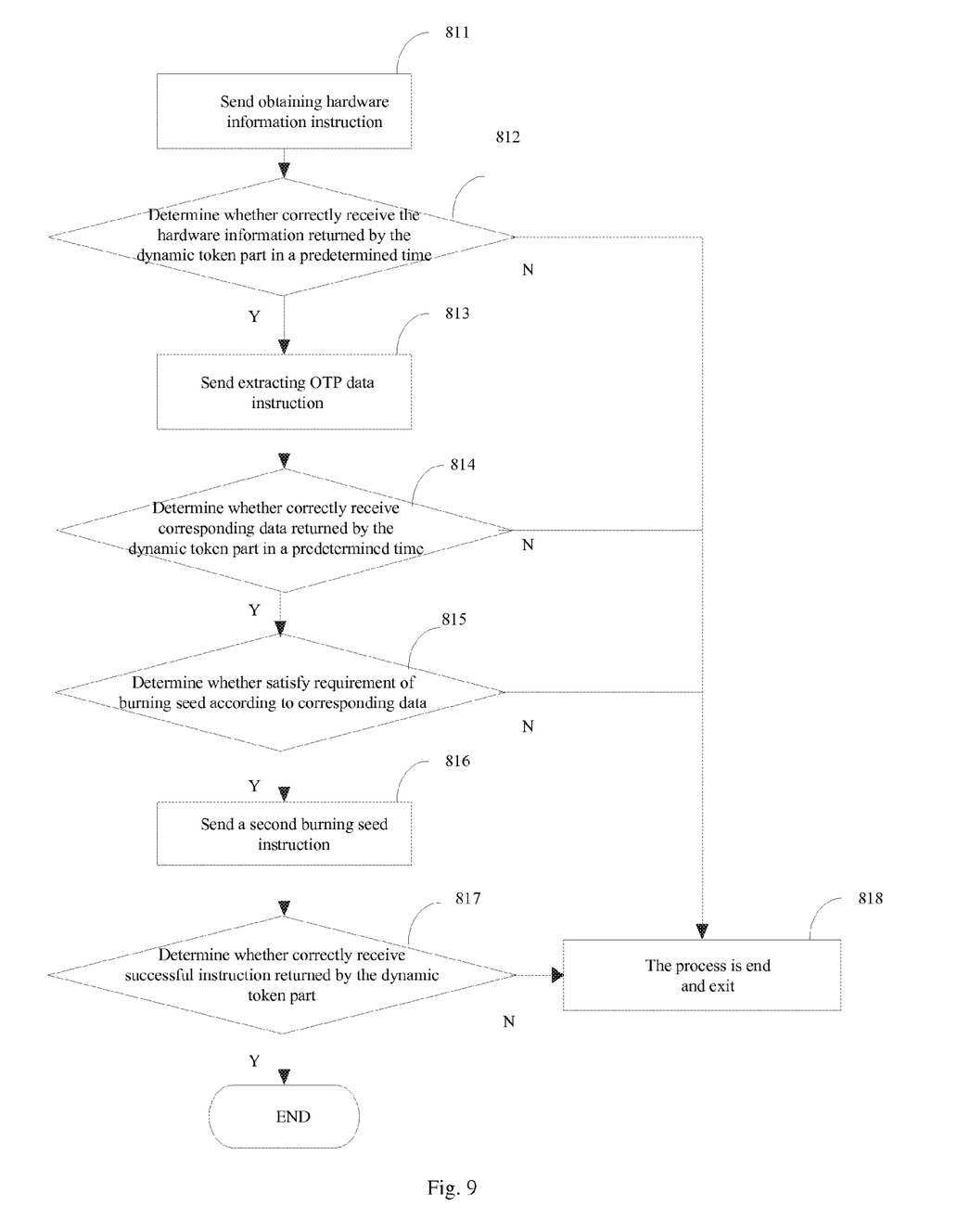
FIG. 9 is a flow chart of a second stage of a method for communicating the dynamic token with the tool provided by Embodiment 4 of the present invention.

Referring to FIG. 8 and FIG. 9, a method of communicating a dynamic token and a tool is provided in the present embodiment. Specifically, the method is a process that the tool programmes a seed in the dynamic token part. The specific process that the tool part programmes the seed in the dynamic token part includes two stages; in this case, carrier signal is generated when the tool part starts work. Specifically, steps of respective stage are disclosed as follows.

The first stage includes the following steps.

Step 801, the tool part sends obtaining hardware information instruction signal to the dynamic token part.

Step 802, the tool part determines whether hardware information signal returned by the dynamic token part in a predetermined time is correctly received; if yes, goes to next step; otherwise goes to step 810.

Step 803, the tool part sends crystal outputting and controlling instruction signal to the dynamic token part.

Step 804, the tool part determines whether clock signal and successful communication instruction signal returned by the dynamic token part are correctly received, if yes, goes to next step; otherwise, goes to step 810.

Specifically, the clock signal returned by the dynamic token part is second signal output with a specific frequency, clock signal of 32.768 KHZ or clock signal related to the clock signal of 32.768 KHZ after that the dynamic token part correctly receives the crystal outputting and controlling instruction signal sent by the tool part.

Step 805, the tool part calculates crystal calibration data according to the clock signal and standard clock signal returned by the dynamic token part.

Specifically, the process of the tool part calculating the crystal calibration data according to the clock signal and standard clock signal returned by the dynamic token part includes that the tool part calculates a deviation between the standard clock signal and the clock signal returned by the dynamic token part, calculates the crystal calibration data according to the deviation and generates setting crystal calibration data instruction signal.

Step 806, the tool part sends the setting crystal calibration data instruction signal.

Step 807, the tool part determines whether the successful communication instruction signal returned from the dynamic token part is correctly received, if yes, goes to next step; otherwise goes to step 810.

Step 808, the tool part sends a first programming seed instruction signal to the dynamic token part.

Step 809, the tool part determines whether the successful communication instruction signal returned from the dynamic token part is correctly received in a predetermined time, if yes, goes to the second stage; otherwise, goes to step 810.

Step 810, the tool part outputs prompting information of error and the process is ended.

The second stage includes the following steps.

Step 811, the tool part sends the obtaining hardware information instruction signal in a specified time.

Step 812, the tool part determines whether the hardware information signal returned from the dynamic token part is received, if yes, goes to next step; otherwise goes to step 818.

Step 813, the tool part sends extracting OTP data instruction signal to the dynamic token part.

Step 814, the tool part determines whether corresponding data signal returned from the dynamic token part is correctly received, if yes, goes to next step, otherwise goes to step 818.

Step 815, the tool part determines whether the requirement of programming seed is satisfied according to the data carried by the received corresponding signal, if yes, goes to next step; otherwise, goes to step 818.

Step 816, the tool part sends a second programming seed instruction signal to the dynamic token part.

Step 817, the tool part determines whether successful communication instruction signal returned from the dynamic token part is correctly received, if yes, outputs the prompting information that the communication is successful at this time and the process is ended; otherwise, goes to step 818.

Step 818, the tool part outputs error prompting information and the process is ended.

Figure 10:
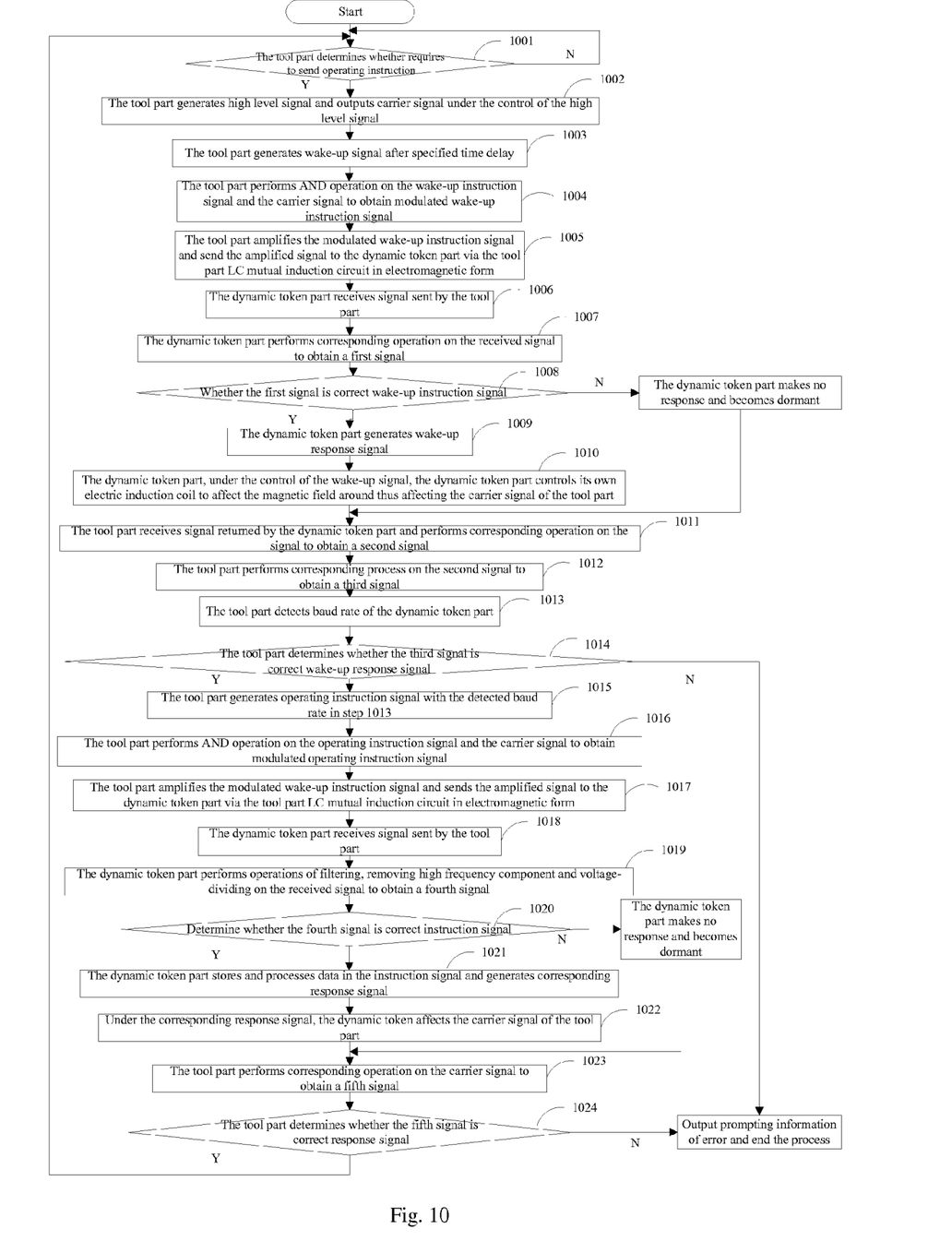
FIG. 10 is a flow chart of a communicating method of performing an operating instructing signal between the dynamic token and the tool provided by Embodiment 4 of the present invention.

Specifically, the tool part sends instruction signal, which includes the obtaining hardware information signal, the crystal outputting and controlling signal, the setting crystal calibration data instruction signal, the programming seed instruction signal, the extracting OTP data instruction signal and the programming seed instruction signal; the dynamic token part receives and processes the signal which is sent by the tool part and returns corresponding response signal, which includes the hardware information signal, the successful communication signal and corresponding data signal. The process that the tool part receives corresponding signal returned by the dynamic token part is shown by FIG. 10, which specifically includes the following steps.

Step 1001, the tool part determines whether sending operating instruction is required, if yes, goes to next step; otherwise, goes on determining whether sending operating instruction is required.

Step 1002, the tool part generates high level signal and outputs the carrier signal under control of the high level signal.

Specifically, in the embodiment, when the tool part generates the high level signal, the tool part performs AND operation on the carrier signal and the high level signal and outputs the carrier signal.

Step 1003, the tool part generates wake-up instruction signal after a specified time delay.

Specifically, in the present embodiment, the tool part generates the wake-up instruction signal and then continues to output the carrier signal, i.e. keeps on generating high level signal.

Step 1004, the tool part performs AND operation on the carrier signal and the wake-up instruction signal to obtain modulated wake-up instruction signal.

Step 1005, the tool part amplifies the modulated wake-up instruction signal and sends the amplified signal to the dynamic token part in form of electromagnetic wave by the tool part LC mutual inducting circuit.

Step 1006, the dynamic part receives the signal sent from the tool part.

Step 1007, the dynamic token part performs corresponding operation on the received signal to obtain a first signal.

Preferably, in the present embodiment, the corresponding operation includes signal detecting, high frequency component filtering and eliminating and voltage limiting.

Step 1008, the dynamic token part determines whether the first signal is correct wake-up instruction signal, if yes, goes to next step; otherwise, the dynamic token part makes no response and rests, goes to step 1011.

Step 1009, the dynamic token part generates wake-up response signal.

Step 1010, the dynamic token part, under the control of the wake-up signal, controls its own electric induction coil to affect the magnetic field around so as to affect the carrier signal of the tool part.

Step 1011, the tool part receives the signal returned by the dynamic token part and performs corresponding operation on the signal to obtain a second signal.

Preferably, in the present embodiment, performing corresponding operation on the signal specifically includes performing operation such as detecting, removing DC component, amplifying and filtering and removing high frequency component on the signal, or after performing removing DC component and voltage dividing on the signal, performing AND operation on the processed signal and the reverse-phase signal of the carrier signal to obtain a second signal.

Step 1012, the tool part performs corresponding operation on the second signal to obtain a third signal.

Preferably, in the present embodiment, performing corresponding operation on the second signal to obtain the third signal specifically includes performing operation of removing DC component on the second the signal and operation of comparing and outputting to obtain the third signal, or taking the second signal as the input of the trigger; taking the signal obtained by performing AND operation on the carrier signal and the signal obtained by voltage-dividing of the carrier signal as the clock signal of the trigger to obtain the third signal output by the trigger.

Step 1013, the tool part detects the baud rate of the dynamic token part.

Step 1014, the tool part determines whether the third signal is correct wake-up response signal, if yes, goes to next step; otherwise, the tool part outputs promoting information of error and the process is ended.

Step 1015, the tool part generates operating instruction signal according to the baud rate detected in step 1013.

Specifically, in the present embodiment, after generating the instruction signal, the tool part keeps on outputting the carrier signal, i.e. keeps on generate high level signal.

Step 1016, the tool part performs AND operation on the operation instruction signal and the carrier signal to obtain modulated operation instruction signal.

Step 1017, the tool part amplifies the modulated operation instruction signal and sends the amplified signal in electromagnetic form to the dynamic token part by the LC mutual inducting circuit.

Step 1018, the dynamic token part receives the signal sent by the tool part.

Step 1019, the dynamic token part performs operations, such as detection, filtering and removing high-frequency component and voltage limiting, to obtain the fourth signal.

Step 1020, the dynamic token part determines whether the fourth signal is correct instruction signal, if yes, goes to next step; otherwise, the dynamic token part makes no response and rests, goes to step 1023.

Step 1021, the dynamic token part stores and processes the data in the instructing signal and generates corresponding response signal.

Step 1022, the dynamic token part affects the carrier signal of the tool part under the control of corresponding response signal.

Step 1023, the tool part performs corresponding operation on the carrier signal to obtain a fifth signal.

Preferably, the process of the tool part performing corresponding operation on the carrier signal includes performing operations, such as detection, removing DC component, amplification, filtering and removing high frequency component, comparing and outputting, in order to obtain the fifth signal; or after performing removing DC component and voltage-dividing on the signal, performing AND operation on the processed signal and the reverse-phase signal of the carrier signal and taking the result signal of the AND operation as the input signal of the trigger, taking the signal obtained by performing AND operation on the carrier signal and the signal obtained by voltage-dividing of the carrier signal as the clock signal of the trigger; and the output signal of the trigger is the fifth signal.

Step 1024, the tool part determines whether the fifth signal is correct response signal, if yes, goes back to step 1001; otherwise, the tool part outputs promoting information of error and the process is ended.

The foregoing descriptions are merely illustrative of the preferred embodiments of the invention. Any modifications, equivalent alternatives and adaptations made by those skilled in the art in light of the spirit and principle of the invention shall fall within the scope of the invention.

What is claimed is:

1. A system of communicating a dynamic token and a tool, comprising a tool part and a dynamic token part which are communicated with each other by radio frequency communication technology, wherein the tool part comprises a controlling module and a tool radio frequency communicating module;

the controlling module generates wake-up instruction signal and/or operating instruction signal and sends the signal to the tool radio frequency communicating module, determines whether response signal returned by the dynamic token part is correctly received, and controls to output prompting information of successful communication or error according to determining result;

the tool radio frequency communicating module, under the control of the controlling module, generates corresponding modulated signal by using the carrier signal generated by the tool radio frequency communicating module and the wake-up instruction signal and/or the instruction signal, sends the modulated signal to an OTP radio frequency communicating module of the dynamic token part in electromagnetic form, and receives response signal returned by the OTP radio frequency communicating module and sends the response signal to the controlling module;

the dynamic token part comprises an MCU and liquid crystal module and the OTP frequency communicating module;

the OTP radio frequency communicating module receives the modulated signal sent by the tool radio frequency communicating module in electromagnetic form, extracting and processing the received modulated signal; sends the result signal obtained by extracting and processing to the MCU and liquid crystal module and further returns corresponding response signal to the tool radio frequency communicating module;

the MCU and liquid crystal module determines whether the result signal sent by the OTP radio frequency module is correct instruction signal; and generates corresponding response signal if the result signal is correct instruction signal and sends the response signal to the OTP radio frequency communicating module.

2. The system of claim 1, wherein the process of the controlling module generating and sending the wake-up instruction signal specifically comprises:
  determining whether sending the wake-up operating instruction is required; and, if the result of determining is yes, controlling the radio frequency communicating module to output carrier signal, generating the wake-up instruction signal after a specified time delay and sending the wake-up instruction signal to the tool radio frequency communicating module;
  the process of the controlling module generating and sending the operating instruction signal specifically comprises: detecting the baud rate of the dynamic token part when receiving the response signal of the wake-up operating instruction in a predetermined time generating the operating instruction signal according to the detected baud rate and sending the operating instruction signal to the tool radio frequency communicating module.

3. The system of claim 1, wherein
  the operating instruction signal comprises obtaining hardware information instruction signal, crystal outputting and controlling instruction signal, setting crystal calibration data instruction signal, extracting OTP data instruction signal and programming seed instruction signal;
  the modulated signal comprises modulated wake-up instruction signal and modulated operating instruction signal.

4. The system of claim 1, wherein
  the tool radio frequency communicating module comprises a signal preparing and receiving-sending sub-module and a signal processing sub-module;
  the signal preparing and receiving-sending sub-module comprises:
  a carrier signal generating unit generating carrier signal;
  a signal mixing unit, under the control of the controlling module, outputting the carrier signal to a first signal strength adjusting unit; and mixing the instruction signal sent by the controlling module and the carrier signal to obtain the modulated signal;
  the first signal strength adjusting unit adjusting the strength of the carrier signal and the modulated signal;
  a signal driving unit driving the signal output by the first signal strength adjusting unit and amplifying the power of the output signal; and
  a tool part LC mutual inducting unit sending the signal output by the signal driving unit to the dynamic token part and further receiving the signal returned by the dynamic token part;
  the signal processing sub-module extracts and processes the signal which is returned by the dynamic token part and received by the tool part LC mutual inducting unit and sends the extracted and processed signal to the controlling module.

5. The system of claim 4, wherein the signal processing sub-module comprises:
  a signal extracting unit extracting the signal returned by the dynamic token part and received by the tool part LC mutual inducting unit;
  an interference eliminating unit eliminating the affect of the signal sent by the preparing and receiving-sending sub-module on the signal processing sub-module;
  a signal amplifying unit amplifying the signal obtained by the signal extracting unit;
  a filtering unit filtering and eliminating the high frequency component output by the signal amplifying unit; and
  a signal rectifying unit conversing the signal output by the filtering unit to be TTL signal which can be identified by the controlling module.

6. The system of claim 4, wherein the signal processing sub-module comprises:
  a signal extracting unit extracting the signal received by the tool part LC mutual inducting unit;
  a second signal strength adjusting unit adjusting the strength of the signal extracted by the signal extracting unit;
  a phase adjusting unit performing reverse-phase processing on the carrier signal generated by the carrier generating unit;
  a mixing and comparing unit mixing the signal output by the second signal strength adjusting unit and the signal output by the phase adjusting unit and sending the mixed signal to the signal rectifying unit;
  a synchronizing signal extracting unit obtaining the carrier signal generated by the carrier generating unit; extracting and processing the carrier signal to obtain synchronizing clock signal and sending the synchronizing clock signal to the signal rectifying unit; and
  the signal rectifying unit arranging the signal output by the mixing and comparing unit according to the synchronizing clock signal and sending the signal obtained by comparing and arranging to the controlling module.

7. The system of claim 1, wherein the OTP radio frequency communicating module comprises:
  a dynamic token part LC mutual inducting unit receiving the signal sent by the tool part, and returning the signal to the tool part under the control of a data sending and controlling unit;
  a signal extracting and chip protecting unit extracting the signal received by the dynamic token part LC mutual inducting unit and processing the signal obtained by extracting to obtain TTL signal which is identifiable and non-destructive to the MCU and liquid crystal module and sending the TTL signal to the MCU and liquid crystal module;
  the data sending and controlling unit, under the control of the MCU and liquid crystal module, making two ends of an electric induction coil of the dynamic token part LC mutual inducting unit be inducting or disconnecting so as to affect the amplitude of the carrier signal generated by the tool part by the change of electromagnetic field.

8. A method of communicating a dynamic token and a tool, wherein the method is based on radio frequency communicating technology and comprises:
  Step A, generating, by the tool part, wake-up instruction signal and carrier signal, obtaining modulated wake-up instruction signal according to the wake-up instruction signal and the carrier signal and sending the modulated wake-up instruction signal to the dynamic token part in electromagnetic form;
  Step B, performing, by the tool part, corresponding operation on the received signal which is returned by dynamic token part to obtain operating result signal;
  Step C, detecting, by the tool part, baud rate of the dynamic token part and determining whether the operating result signal obtained in Step B is correct wake-up responding signal, if yes, going to Step D; otherwise, outputting prompting information of error and ending;

Step D, generating, by the tool part, operating instruction signal according to the detected baud rate, obtaining modulated operating instruction signal according to the operating instruction signal and the carrier signal and sending the modulated operating instruction signal to the dynamic token part dynamic token part in electromagnetic form;

Step E, performing, by the tool part, corresponding operation on the signal returned by the dynamic token part to obtain operating result signal; and Step F, determining, by the tooling part, whether the operating result signal obtained in Step E is correct response signal, if yes, outputting prompting information of successful communication, ending or going back to Step A; otherwise, outputting prompt information of error and ending.

9. The method of claim 8, wherein Step B and Step E specifically comprises:
receiving, by the tool part, the signal returned by the dynamic token part and performing operations of detecting, removing DC component, amplifying, removing high frequency component and comparing and outputting;
the signal obtained by comparing and outputting is the operating result signal.

10. The method of claim 8, wherein Step B and Step E specifically comprises:
receiving, by the tooling part, the signal returned by the dynamic token part, after performing a process of removing DC component on the signal, performing AND operation on the processed signal and the reverse-phase signal of the carrier signal, taking the signal obtained by AND operation as the input of a trigger, and taking signal obtained by performing AND operation on the carrier signal ant the signal obtained by voltage-dividing on the carrier signal as clock signal of the trigger;
the signal output by the trigger is the operating result signal.

11. The method of claim 8, wherein between Step A and Step B, and between the Step D and Step E, the method comprising a step of:
generating, by the tool part, high level signal, amplifying the signal obtained by performing AND operation on the high level signal and the carrier signal and outputting the amplified signal by the LC mutual inducting circuit in electromagnetic form.

12. The method of claim 8, wherein a processing operation of the dynamic token part between Step A and Step B specifically comprises:
Step a, receiving, by the dynamic token part, the signal sent by the tool part, performing operations of detecting, removing high frequency component and voltage-limiting on the received signal and determining whether the signal obtained by performing the operations is correct wake-up instruction signal, if yes, going to Step b; otherwise making no response and resting;
Step b, generating, by the dynamic token part, wake-up response signal and, under the control of the wake-up response signal, controlling an electric induction coil to affect the magnetic field around so as to affect the carrier signal of the tool part.

13. The method of claim 8, wherein a corresponding operation of the dynamic token part between Step D and Step E specifically comprises:

Step f, receiving, by the dynamic token part, the signal sent by the tool part, performing operations of detecting, removing high frequency component and voltage limiting on the received signal and determining whether the signal obtained by performing the operations is correct instruction signal, if yes, going to Step C; otherwise, making no response and resting;
Step g, storing and processing, by the dynamic token part, the data in the instruction signal and generating corresponding response signal and, under the control of the corresponding response signal, controlling an electric induction coil to affect the magnetic field around so as to affect the carrier signal of the tool part.

14. The method of claim 8, wherein the operating instruction signal comprises obtaining hardware information instruction signal, crystal outputting and controlling instruction signal, setting crystal calibration data instruction signal, extracting OTP data instruction signal and programming seed instruction signal.

15. The method of claim 14, wherein when the operating instruction signal is the obtaining hardware information instruction signal, the tool part determines whether hardware information returned by the dynamic token part is correctly received in a predetermined time; if yes, sends the crystal outputting and controlling signal or the extracting OTP data instruction signal; otherwise, outputs prompt information of error and ends the process.

16. The method of claim 14, wherein when the operating instruction signal is the crystal outputting and controlling signal, the tool part determines whether clock signal returned by the dynamic token part is correctly received in a predetermined time, if yes, generates and sends the setting crystal calibration data instruction signal according to standard clock signal and the clock signal; otherwise, outputs prompting information of error and ends the process; wherein,
the clock signal is second signal output with a specific frequency, clock signal of 32.768 KHZ or clock signal related to the clock signal of 32.768 KHZ after the dynamic token part correctly receives crystal outputting and controlling instruction signal sent by the tool part;
the process of generating the setting crystal calibration data instruction signal according to the standard clock signal and the clock signal specifically comprises: computing, by the tool part, a deviation between the clock signal returned by the dynamic token part and the standard clock signal, computing out the crystal calibration data according to the deviation and generating the setting crystal calibration data instruction signal according to the crystal calibration data.

17. The method of claim 14, wherein when the operating instruction signal is the setting crystal calibration data instruction signal, the tool part determines whether the successful communication instruction signal returned by the dynamic token part is correctly received in a predetermined time, if yes, sends the programming seed instruction signal; otherwise, outputs prompting information of error and ends the process.

18. The method of claim 14, wherein when the operating instruction signal is the extracting OTP data instruction signal, the tool part determines whether corresponding data returned by the dynamic token part is correctly received in a predetermined time, if corresponding data is correctly received, determines whether the dynamic token satisfies a predetermined programming seed requirement according to the corresponding data, if the dynamic token satisfies the predetermined programming seed requirement, sends programming seed instruction signal, if the dynamic token does not satisfy the predetermined programming seed requirement, outputs prompting information of error and ends the process; if corresponding data is not correctly received, outputs prompting information of error and ends the process.

19. The method of claim 14, wherein when the operating instruction signal is the programming seed instruction signal, the tool part determines whether successful communication instruction signal returned by the dynamic token part is correctly received in a predetermined time, if yes, outputs prompting information of successful communication for this time, ends or sends obtaining hardware information instruction signal; otherwise, outputs prompting information of error and ends the process.

* * * * *